(12) United States Patent
Rajapaksha et al.

(10) Patent No.: US 11,336,331 B2
(45) Date of Patent: *May 17, 2022

(54) POWER DELIVERY AND DATA COMMUNICATION OVER A SINGLE PAIR OF CABLES

(71) Applicant: TEXAS INSTRUMENTS INCORPORATED, Dallas, TX (US)

(72) Inventors: Dushmantha Bandara Rajapaksha, Allen, TX (US); Wesley Ray, Frisco, TX (US); Hao Liu, Dallas, TX (US); Maxwell Robertson, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,984

(22) Filed: May 27, 2021

(65) Prior Publication Data

US 2021/0288690 A1 Sep. 16, 2021

Related U.S. Application Data

(63) Continuation of application No. 16/438,165, filed on Jun. 11, 2019, now Pat. No. 11,050,460.

(Continued)

(51) Int. Cl.
*H04B 3/54* (2006.01)
*H04L 27/04* (2006.01)
(Continued)

(52) U.S. Cl.
CPC ............... *H04B 3/542* (2013.01); *H04B 1/69* (2013.01); *H04L 5/16* (2013.01); *H04L 27/0002* (2013.01); *H04L 27/04* (2013.01); *H04L 27/06* (2013.01)

(58) Field of Classification Search
CPC ... H04B 1/38; H04B 1/40; H04B 3/54; H04B 3/542; H04B 3/548; H04B 3/56;
(Continued)

(56) References Cited

U.S. PATENT DOCUMENTS 4,641,126 A 2/1987 Crowe
4,862,157 A 8/1989 Noel
(Continued)

FOREIGN PATENT DOCUMENTS

KR 101400688 5/2014

OTHER PUBLICATIONS

International Search report in corresponding PCT Application No. PCT/2019/036678 dated Oct. 3, 2019 (2 pages).
(Continued)

*Primary Examiner* — Young T. Tse
(74) *Attorney, Agent, or Firm* — John R. Pessetto; Charles A. Brill; Frank D. Cimino

(57) ABSTRACT

Systems and methods are disclosed for an integrated circuit (IC) comprising an oscillator, an on-off-keying modulator configured to modulate input data coupled to the oscillator, a serial communications transmitter coupled to the on-off-keying modulator, a serial communications receiver coupled to the serial communications transmitter by a set of cables, and an envelope detector coupled to the serial communications receiver. In the IC, power and data are simultaneously delivered across the same set of cables from the serial communications transmitter to the serial communications receiver.

6 Claims, 3 Drawing Sheets

Related U.S. Application Data

(60) Provisional application No. 62/684,243, filed on Jun. 13, 2018.

(51) Int. Cl.
   *H04L 5/16*   (2006.01)
   *H04B 1/69*   (2011.01)
   *H04L 27/00*  (2006.01)
   *H04L 27/06*  (2006.01)

(58) Field of Classification Search
   CPC ......... H04L 5/14; H04L 5/16; H04L 27/0002; H04L 27/0008; H04L 27/02; H04L 27/04; H04L 27/06
   USPC ........ 375/219, 220, 222, 257; 370/282, 284, 370/296
   See application file for complete search history.

(56) References Cited

U.S. PATENT DOCUMENTS

| | | | |
|---|---|---|---|
| 5,818,821 | A | 10/1998 | Schurig |
| 6,097,761 | A | 8/2000 | Buhring et al. |
| 6,275,144 | B1 | 8/2001 | Rumbaugh |
| 6,411,173 | B1 * | 6/2002 | Eddy ................ H03H 7/42 333/25 |
| 6,449,318 | B1 | 9/2002 | Rumbaugh |
| 6,519,328 | B1 | 2/2003 | Rumbaugh |
| 7,317,793 | B2 | 1/2008 | Binder et al. |
| 8,680,690 | B1 | 3/2014 | Steeneken et al. |
| 2001/0050580 | A1 | 12/2001 | O'Toole et al. |
| 2011/0156658 | A1 | 6/2011 | Schubert |
| 2013/0301690 | A1 | 11/2013 | Shreshtha |
| 2016/0164535 | A1 * | 6/2016 | Schenzinger ....... G06F 13/4295 375/282 |
| 2018/0269272 | A1 * | 9/2018 | Cook ................ H01L 23/66 |
| 2019/0068410 | A1 | 2/2019 | Al-Shyoukh et al. |
| 2019/0385057 | A1 | 12/2019 | Litichever |

OTHER PUBLICATIONS

ANSI TIA/EIA-485-A Electrical Characteristics of Generators and Receivers for Use in Balanced Digital Multipoint Systems, Telecommunications Industry Association, approved Mar. 3, 1998, copyright 2000 (22 pages).

Kugelstadt, Thomas. "The RS-485 Design Guide." Texas Instruments, Application Report. SLLA272C—Feb. 2008—Revised Oct. 2016. 10 pages.

* cited by examiner

POWER DELIVERY AND DATA COMMUNICATION OVER A SINGLE PAIR OF CABLES

CROSS-REFERENCE TO RELATED APPLICATIONS

This application is a continuation of Ser. No. 16/438,165, filed Jun. 11, 2019, which claims priority to U.S. Provisional Application No. 62/684,243, filed Jun. 13, 2018, both of which are hereby incorporated by reference in their entirety.

BACKGROUND

A typical system for RS485/RS422 data communication needs two pairs of cables whenever power delivery is also required. This additional cabling results in higher costs and may be disadvantageous from a cost standpoint.

SUMMARY

Systems and methods are disclosed for an integrated circuit (IC) comprising an oscillator, an on-off-keying modulator configured to modulate input data coupled to the oscillator, a serial communications transmitter coupled to the on-off-keying modulator, a serial communications receiver coupled to the serial communications transmitter by a set of cables, and an envelope detector coupled to the serial communications receiver. In the IC, power and data are simultaneously delivered across the same set of cables from the serial communications transmitter to the serial communications receiver.

BRIEF DESCRIPTION OF THE DRAWINGS

For a detailed description of various examples, reference will now be made to the accompanying drawings in which.

DETAILED DESCRIPTION

Figure 1:
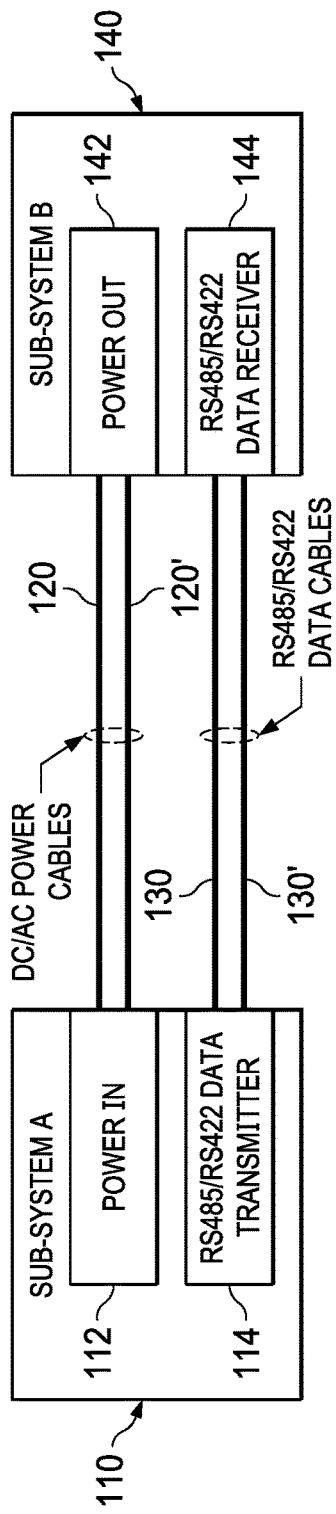
FIG. 1 illustrates system in which power is transmitted through separate cables from RS485/RS422 data.

FIG. 1 illustrates an example of a system in which power is transmitted through separate cables from RS485/RS422 data. RS-485 applications benefit from differential signaling over twisted-pair cables. As discussed herein, RS485 and RS422 are industry standards defining the electrical characteristics of drivers and receivers for use in serial communications. RS485 defines the electrical characteristics of drivers and receivers that could be used to implement a balanced multipoint transmission line. See "The RS-485 Design Guide," available at https://www.ti.com/lit/an/slla272c/slla272c.pdf. Typically, RS485 and RS422 standards involve data transmission only and do not contemplate power delivery through the same physical medium. This type of cabling is generally at a system level and does not incorporate any kind of signal modulation. In the system shown, sub-system A 110 is coupled to sub-system B 140 using two pairs of cables. The first set of cables 120, 120' couple the Power IN 112 of Sub-system A 110 to the Power OUT 142 of Sub-system B 140. In this manner, power is delivered from Sub-system B 140 to Sub-system A 110. Separately, data is transmitted from Sub-system A 110 to Sub-system B 140 using a second pair of cables 130, 130' that couple the RS485/RS422 data transmitter 114 to the RS485/RS422 data receiver 144. The system of FIG. 1 thus requires two sets of cables for operation, thereby resulting in significant cabling costs and unfavorable weight increases in implementation.

Figure 2:
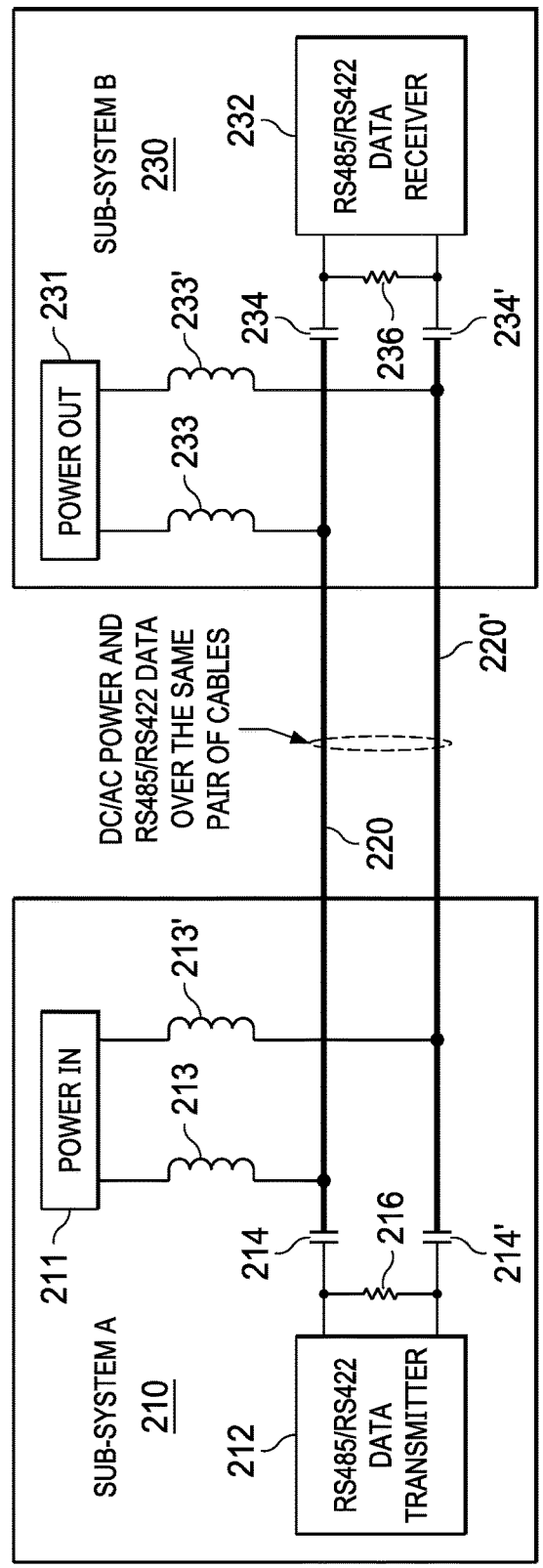
FIG. 2 illustrates an example in which power and data signals are transmitted through the same pair of cables.

FIG. 2 illustrates an example in which power and data signals are transmitted through the same pair of cables. Compared to the example of FIG. 1, the example of FIG. 2 discloses superior techniques for data transmission, preferably using the RS485 and/or RS422 protocols. The illustrative system shown in FIG. 2 comprises Sub-system A 210 and Sub-system B 230. Analogously to FIG. 1, power is delivered and data is transmitted between Sub-system A 210 to Sub-system B 230. Sub-system A comprises a power input, Power IN 211, and a RS485/RS422 data transmitter 212. Sub-system B comprises a power output, Power OUT 231, and a RS485/RS422 data receiver 232. Sub-system A 210 and Sub-system B 230 are coupled together via a single pair of cables 220, 220'.

In FIG. 2, the single pair of cables 220, 220' is configured to carry both power and data. Power delivery may include an alternating current (AC) voltage or direct current (DC) voltage. In this example, data transmission utilizes any suitable protocol such as the RS485 or RS422 protocols. Power is delivered from Sub-system B 230 to Sub-system A 210 from the power output 231 to the power input 211 via the single pair of cables 220, 220'. The power input 211 is coupled to the single pair of cables 220, 220 through a first pair of coupling inductors 213 and 213', respectively. Analogously, the power output is coupled to the single pair of cables through a second pair of coupling inductors 233 and 233', respectively.

The single pair of cables 220, 220' also carry data transmission between the RS485/RS422 data transmitter 212 and the RS485/RS422 data receiver 242. As data is transmitted, it passes through the AC coupling capacitors 214 and 234 in the first cable 220, and through the AC coupling capacitors 214' and 234' through the second cable 220'. The first cable 220 and the second cable 220' are connected by a first resistor 216 on the RS485/RS422 data transmitter 212 side and a second resistor 236 on the RS485/RS422 data receiver 232 side.

As shown in FIG. 2, data is transmitted between the RS485/RS422 data transmitter 212 and the RS485/RS422 data receiver 242 over the single pair of cables 220, 220'. In this illustrative implementation, data is modulated over the existing power cabling. As will be explained further herein, the modulation may take the form of OOK modulation. In certain implementations, that OOK modulation may be handled inside of an RS485 transceiver. In practice, because the OOK modulation occurs inside the transceiver, there is a broad market for the technology. That is because the system offers a wide data range in operation, there is no data DC balancing required, and the electrical signaling parameters conform to the TIA/EIA-485A standard. Furthermore, because OOK modulation occurs in the transceiver, there are no controller or software updates required. Thus, the hardware of the described examples may be included as part of a larger system without costly and time-consuming modifications.

The implementation of FIG. 2 also offers all of the attendant benefits of the RS485 standard because it uses the RS485 physical layer, so that there is flexibility in its implementation. Furthermore, in certain implementations, the system incorporates SSC operations to reduce EMI, thereby improving system performance. In certain other implementations, the system is implemented in a master-slave architecture, allowing for real-time/deterministic operation.

Figure 3:
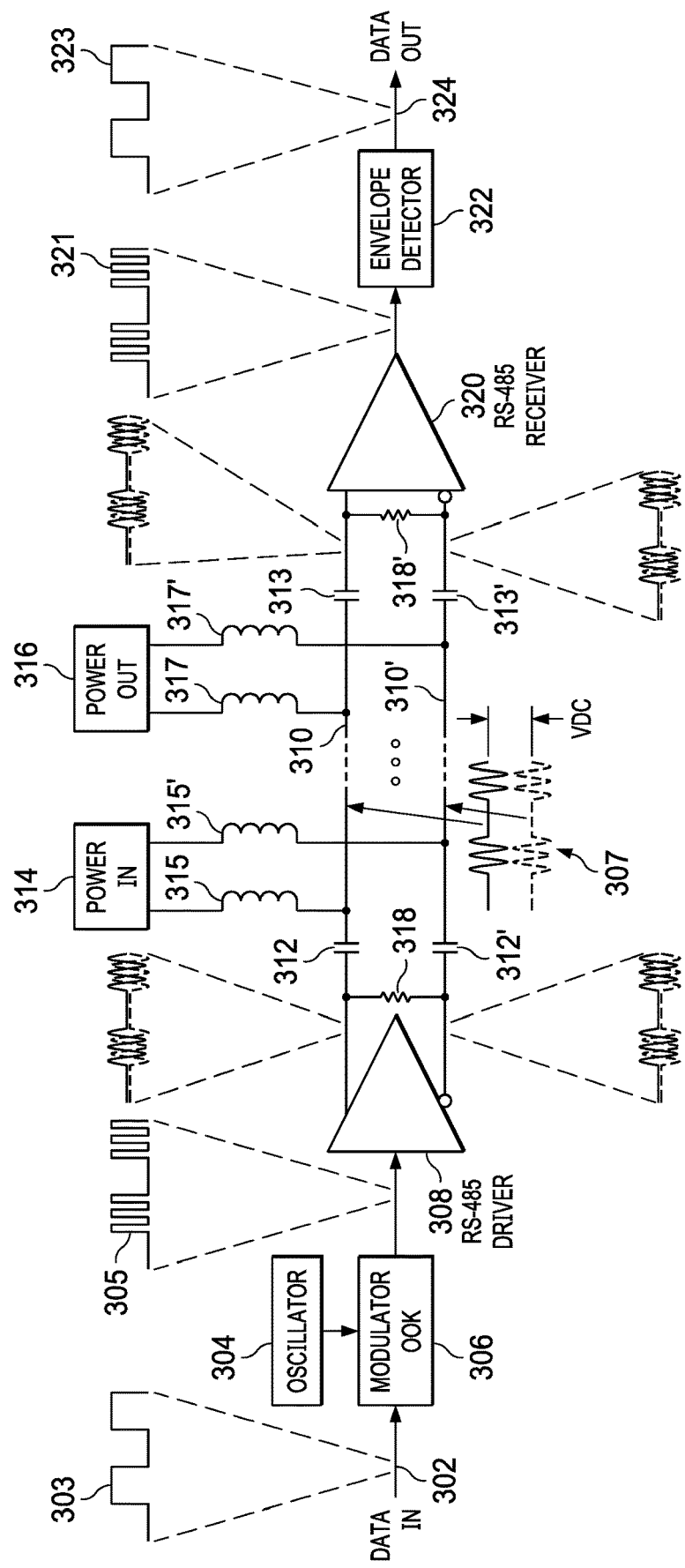
FIG. 3 illustrates an example of the system architecture of the system.

FIG. 3 illustrates an example of the system architecture. In FIG. 3, data is input at Data IN 302. A representation of the data is shown as the waveform 303 below the diagram. The data modulated by an oscillator 304 and the OOK modulator 306 prior to being transmitted to the RS485 driver (also referred to as the transmitter) 308, which is connected to the RS485 receiver. The data transmitted to the RS485 driver 308 has a modulated waveform 305. The data that is input into the RS485 driver 308 is then further modified in accordance with the RS485 standard, such that the data waveform 307 (top waveform) that travels through the pair of cables 310, 310'. On each cable 310, 310', the data passes through a first set of AC coupling capacitors 312, 313 on the first cable 310 and a second set of AC coupling capacitors 312', 313' on the second cable 310'.

Data transmission preferable utilizes the RS485 or RS422 protocols. Power is delivered from the power output, Power OUT 316, to the power input, Power IN 314, via the single pair of cables 310, 310'. The power input 314 is coupled to the single pair of cables 310, 310' through a first pair of coupling inductors 315, 315', respectively. Analogously, the power output, Power OUT, 316 is coupled to the single pair of cables through a second pair of coupling inductors 317 and 317', respectively. Further, as in FIG. 2 above, the pair of cables 310, 310' are connected by a first resistor 318 on the RS485 driver 308 side and a second resistor 318' on the RS485 receiver 320 side. A graphical representation of the power delivery through the pair of cables 310, 310' is shown in the waveform 307 (bottom waveform) below the cables 310, 310'.

At the RS485 receiver 320, the data signal is isolated once more from the power delivery and transmitted to the envelope detector 322 as a waveform 321. That waveform is further modulated at the envelope detector 322, such that the data output, Data OUT, 324 may take the form of the data output signal 323.

Figure 4:
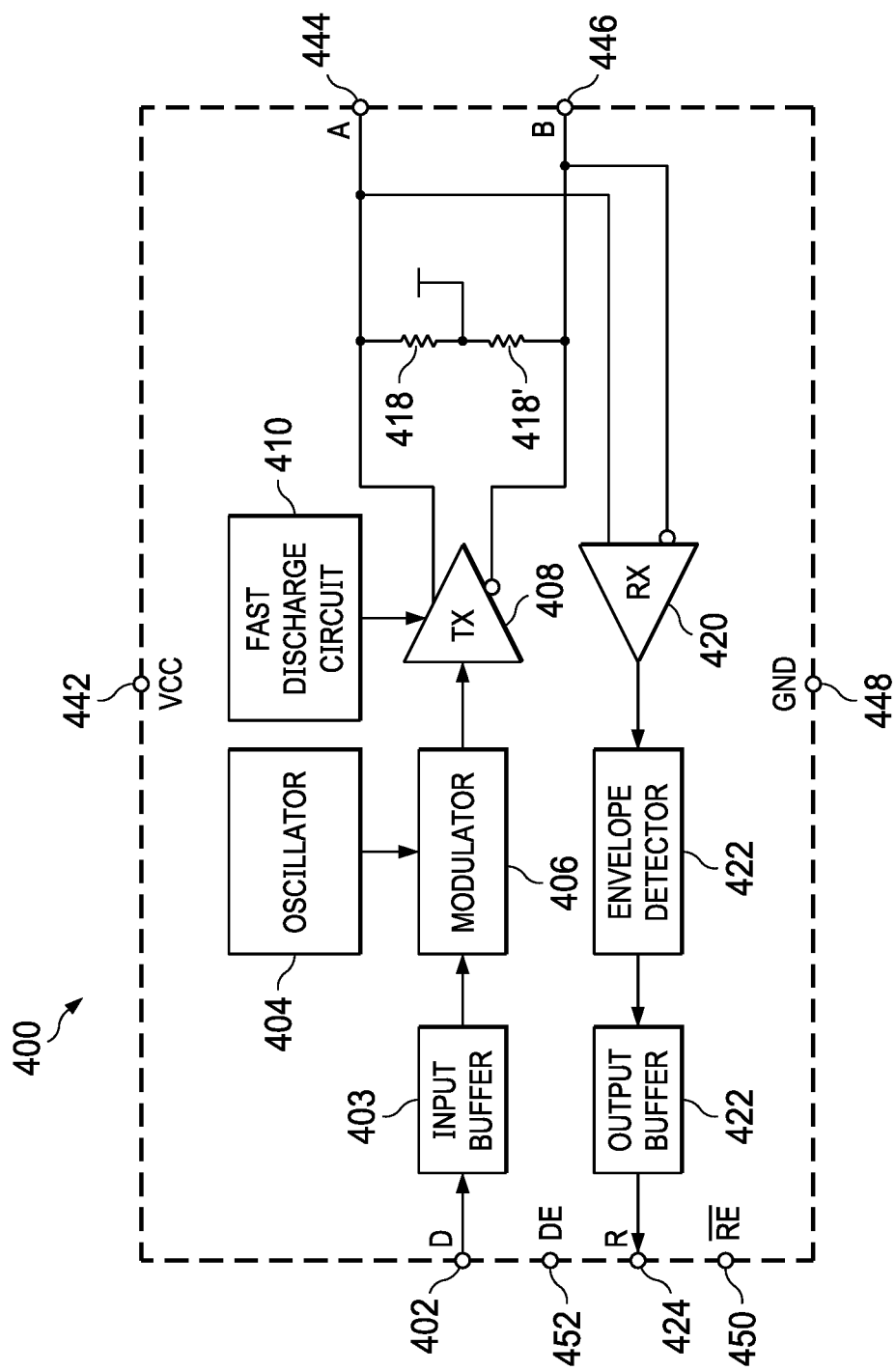
FIG. 4 illustrates an example of a block diagram of the system.

FIG. 4 illustrates an example block diagram of the system. The integrated circuit (IC) 400 includes an RS485 half-duplex system with time division multiplexing. An RS422 standard may be substituted in certain implementations. The IC 400 provides for on-off-keying modulation of the data input within the RS485/RS422 transceiver. The shaded components of the chip 400, OSC 404, Mod. 406, and Env. Det. 422, correspond to the oscillator 304, the OOK modulator 306, and the envelope detector 322, described in FIG. 3. The unshaded components of the chip 400 are found in implementations of the RS485 standard. Those components, which correspond to those described in FIG. 3, are the data input, D 402, the RS485 transmitter/driver, TX 408, the first and second resistors 418, 418', the RS485 receiver, RX 420, and the data output, R 424. Additionally, the chip diagram of FIG. 4 shows the input buffer 403 and the output buffer 422, which are also found inside the RS485 transceiver. The chip 400 components operate consistently with how they are described in FIG. 3.

In a use of the chip 400, the data input 402 flows into the input buffer 403, which then transmits the data to the modulator 406. The data modulated by an oscillator 404 and the OOK modulator 406 prior to being transmitted to the RS485 driver 408, which is connected to the RS485 receiver 420. In this example, the RS485 driver 408 is coupled to a fast discharge circuit (FDC) 410. The FDC 410 actively drives the RS-485 bus to the output common mode voltage with zero swing. This circuit 410 guarantees deterministic discharging of the external series capacitors and extends the cable reach of the system. The RS485 driver 408 and the RS485 receiver 420 are coupled together with a pair of cables 410, 410'. As described in FIG. 3, the pair of cables 410, 410' are connected by at least one resistor 418, 418' on each side. The cables 410, 410' are also coupled to a first bus pin 444 and a second bus pin 446, through which the chip 400 can deliver power, which may be inductively coupled, across the cables 410, 410'. The chip's 400 architecture also preferably includes supply voltage 442, a ground 448, a receiver enable 450, and a driver enable 452.

Modifications are possible in the described systems and methods, and other implementations are possible, within the scope of the claims. All references cited herein are expressly incorporated in their entireties.

In describing the examples in the drawings, specific terminology will be resorted to for the sake of clarity. However, the examples are not intended to be limited to the specific terms so selected, and it is to be understood that each specific term includes all technical equivalents that operate in a similar manner to accomplish a similar purpose. Several examples are described for illustrative purposes, but the principles described herein may be embodied in other forms not specifically shown in the drawings. In this description, the term "couple" or "couples" means either an indirect or direct wired or wireless connection. Thus, if a first device couples to a second device, that connection may be through a direct connection or through an indirect connection via other devices and connections.

The invention claimed is:

1. An integrated circuit comprising:
   an on-off-keying modulator having a data input and having a modulated output;
   a serial communications transmitter having an input coupled to the modulated output and having a first transmitter output and a second transmitter output;
   a serial communications receiver having a first receiver input coupled to the first transmitter output, having a second receiver input coupled to the second transmitter output, and having a received data output;
   an envelope detector having an input coupled to the received data output and having a data output;
   a first bus terminal coupled to the first transmitter output and adapted to be capacitively coupled to a first communication cable that is inductively coupled to a power circuit; and
   a second bus terminal coupled to the second transmitter output and adapted to be capacitively coupled to a second communication cable that is inductively coupled to the power circuit.

2. The integrated circuit of claim 1, in which the serial communications transmitter and the serial communications receiver implement a RS495 standard.

3. The integrated circuit of claim 1, further comprising a resistor coupled between the first bus terminal and the second bus terminal.

4. The integrated circuit of claim 1, further comprising an input buffer having an output coupled to the data input.

5. The integrated circuit of claim 1, in which the serial communications transmitter has a fast discharge input and including a fast discharge circuit having an output coupled to the fast discharge input.

6. The integrated circuit of claim 1, in which the integrated circuit is a half-duplex system.

* * * * *